(12) United States Patent
Hayashi et al.

(10) Patent No.: US 7,866,895 B2
(45) Date of Patent: Jan. 11, 2011

(54) CAGE FOR ROLLER BEARING AND MANUFACTURING METHOD THEREOF

(75) Inventors: Atsunori Hayashi, Tokyo (JP); Toshiyuki Atsumi, Akishima (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 496 days.

(21) Appl. No.: 11/666,982

(22) PCT Filed: Nov. 11, 2005

(86) PCT No.: PCT/JP2005/020698

§ 371 (c)(1),
(2), (4) Date: May 3, 2007

(87) PCT Pub. No.: WO2006/051893

PCT Pub. Date: May 18, 2006

(65) Prior Publication Data

US 2007/0297707 A1 Dec. 27, 2007

(30) Foreign Application Priority Data

Nov. 11, 2004 (JP) ............................. 2004-327797

(51) Int. Cl.
*F16C 33/54* (2006.01)
*B21D 53/12* (2006.01)

(52) U.S. Cl. ...................... 384/572; 384/580; 384/623; 29/898.067

(58) Field of Classification Search ................. 384/450, 384/560, 575, 580, 607, 615, 617, 622, 623, 384/572; 29/898.067
See application file for complete search history.

(56) References Cited

U.S. PATENT DOCUMENTS

| | | | | |
|---|---|---|---|---|
| 2,805,108 A | * | 9/1957 | Palmgren | 384/580 |
| 3,240,542 A | * | 3/1966 | Jahn | 384/623 |
| 3,240,543 A | | 3/1966 | Benson | |
| 3,482,891 A | * | 12/1969 | Hewko et al. | 384/575 |
| 5,211,486 A | * | 5/1993 | Aqvist | 384/560 |
| 5,938,349 A | * | 8/1999 | Ogawa | 384/615 |
| 6,106,158 A | * | 8/2000 | Hayashi et al. | 384/623 |
| 6,203,205 B1 | * | 3/2001 | Murai et al. | 384/450 |
| 6,767,135 B2 | * | 7/2004 | Yokota | 384/580 |
| 7,066,655 B2 | | 6/2006 | Fujioka et al. | |

FOREIGN PATENT DOCUMENTS

| | | | |
|---|---|---|---|
| DE | 2014420 B | * | 6/1978 |
| JP | 49-49339 | | 4/1974 |
| JP | 64-55322 | | 4/1989 |
| JP | 3-51225 | | 5/1991 |
| JP | 2000-192965 | | 7/2000 |
| JP | 2000-213546 | | 8/2000 |
| JP | 2001-516644 | | 10/2001 |
| JP | 2004-211824 | | 7/2004 |

* cited by examiner

*Primary Examiner*—Marcus Charles
(74) *Attorney, Agent, or Firm*—McGinn IP Law Group, PLLC

(57) ABSTRACT

In the present cage, both pillar portions which face each other in a circumferential direction of a pocket have a plurality of bent portions which are alternately bent in a width direction, and each bent portion is provided with roller stopping portions protruding into the pocket. The bent portions are formed in a curved cross-sectional shape. Tip portions of the bent portions in the thickness direction of the cage are formed in a cross-sectional shape that becomes narrower toward the tips, and the tip portions are drawn in a state where they protrude into the pocket by plastic deformation working, thereby forming the roller stopping portions.

12 Claims, 12 Drawing Sheets

US 7,866,895 B2

CAGE FOR ROLLER BEARING AND MANUFACTURING METHOD THEREOF

TECHNICAL FIELD

The present invention relates to a cage for a needle roller bearing and a cylindrical roller bearing, and a manufacturing method thereof.

BACKGROUND ART

Referring to FIG. 12, a conventional cage 100 for a roller bearing will be described. FIG. 12 shows the cross-sectional shape of one of both pillar portions which face each other in a circumferential direction in a pocket 101. The shape of the other pillar portion is also the same. Each pillar portion has a plurality of bent portions 102, 103 and 104 which are alternately bent in the width direction of the cage to hold the diameter (the diameter of a pitch circle of the roller, hereinafter referred to as "roller PCD") of a circle line connecting centers of the roller in the thickness direction of the cage. The bent portions 102 to 104 are respectively provided with roller stopping portions 105 to 107 protruding in the shape of a claw or a tongue piece into the pocket hole 101. A roller 108 is retained within the pocket 101 by the roller stopping portions 105 to 107 (refer to Patent Literatures 1 and 2).

According to the configuration of the conventional cage 100 as described above, in the manufacturing processes of the cage, there is a pocket forming process of punching an annular blank made of a steel plate which is alternately bent in the shape of "W" in cross section in the width direction, thereby forming pockets 101. In this process, the roller stopping portions 105 to 107 are simultaneously formed such that portions of the bent portions 102 to 104 protrude toward the pocket 101. Thus, flat regions which are relatively long in the width direction of the cage are required in the bent portions 102 to 104 for formation of the roller stopping portions 105 to 107. For this reason, the interval of the bent portions 102 to 104 in the width direction of the cage becomes long. As a result, there is a limit to shortening the interval of the roller stopping portions 105 to 107 in the width direction of the cage. It is thus difficult to shorten the width of the pocket in the width direction of the cage beyond the limit and to manufacture a cage capable of retaining a roller (short roller) whose length is short. Further, assuming that the interval of the roller stopping portions 105 to 107 and the plate thickness thereof are represented by "D" and "T", respectively, in the configuration of the conventional cage, the cage thickness (height) of 2T+D is necessary. As a result, even if the interval D can be shortened in response to the diameter of a roller, the thickness of the cage cannot be reduced to less than 2T. Thus, this 2T becomes a limit to miniaturization of the cage in the thickness direction. Consequently, it is difficult to miniaturize the cage beyond the above limit.

Patent Document 1: JP-UM-A-64-55322
Patent Document 2: JP-UM-A-03-51225

DISCLOSURE OF THE INVENTION

Problems to be Solved by the Invention

Accordingly, the object to be achieved by the present invention is to enable a cage to be further shortened in a width direction so that a roller whose length is short may be retained and to enable the height of the cage to be further reduced when retaining a roller having the same roller diameter.

Means for Solving the Problems

A cage for a roller bearing according to the present invention is a cage for a roller bearing in which both pillar portions which face each other in a circumferential direction of a pocket have a plurality of bent portions which are alternately bent in a width direction of the cage to sandwich a roller PCD in the thickness direction of the cage, and each bent portion is provided with roller stopping portions protruding into the pocket. Tip portions of the bent portions in the thickness direction of the cage are formed in a cross-sectional shape that becomes narrower toward the tips, and the tip portions are drawn in a state where they protrude into the pocket by plastic deformation processing, thereby forming the roller stopping portions.

Preferably, the bent portions have a curved cross-sectional shape. If the bent portions have a curved cross-sectional shape, the tip portions thereof also have a curved shape. In this case, even if the whole bent portions do not necessarily have a curved cross-sectional shape, only at least the tip portions thereof may have a curved cross-sectional shape.

Preferably, regions of the tip portions to be elastically deformed are less than the plate thickness of a raw material for the cage.

The tip portions of the bent portions in the thickness direction of the cage may have arbitrary cross-sections if only they have a cross-sectional shape that becomes narrower towards the tips. As such a cross-sectional shape, there are, for example, an arcuate cross-sectional shape, an elliptical cross-sectional shape, etc. However, the tip portions may also include a triangular cross-sectional shape, not limited to the aforementioned cross-sectional shape.

In the cage of the present invention, the tip portions of the bent portions in which the roller stopping portions are to be formed are formed in a shape that becomes narrower toward the tips. Thus, if the roller stopping portions are formed in regions closer to the tip portions, the length of the roller stopping portions in the width direction of the cage can be shortened that much. Thereby, the regions of the bent portions in the width direction of the cage, which are required for formation of the roller stopping portion, can also be made narrow and small. As a result, in the cage of the present invention, the length of the cage in the width direction can be shortened, thereby bringing the roller stopping portions in the width direction of the cage closer to each other. Consequently, it is possible to effectively retain a roller (short roller) whose length is shorter, which cannot be achieved in the related art.

Further, in the cage of the present invention, the roller stopping portions are provided in the tip portions of the bent portions. Thus, even if the facing distance of the roller stopping portions in the thickness direction of the cage is the same, the height of the cage can be reduced as compared with a conventional cage where the roller stopping portions are provided in the whole bent portions. More specifically, in the cage of the present invention, when the interval of the roller stopping portions and the plate thickness thereof are defined as "D" and "T", respectively, and when the thickness of the roller stopping portions are made small at foremost ends of the bent portions, it becomes possible to make the thickness of the cage D≅2T. As a result, the plate thickness of a raw material for the cage can be reduced to less than 2T beyond the limits of a reduction in the thickness of the conventional cage.

Moreover, in the present invention, only the tip portions of the bent portions are drawn in a state where they protrude into the pocket by plastic deformation processing. Thus, the regions of the roller stopping portions to be formed become small, whereby the processing force required for the deformation of the roller stopping portions becomes small. Consequently, it is possible to avoid degradation of precision when the roller stopping portions are formed.

Effects of the Invention

According to the cage for a roller bearing of the present invention, it is possible to retain a roller which is shorter than a conventional one. Further, it is possible to obtain a cage which is made smaller than a conventional cage while a roller stopping function is ensured to the same degree as a conventional one.

BEST MODE FOR CARRYING OUT THE INVENTION

Hereinafter, a cage for a roller bearing (hereinafter referred to as cage) according to an embodiment of the invention will be described in detail with reference to the accompanying drawings.

Figure 1:
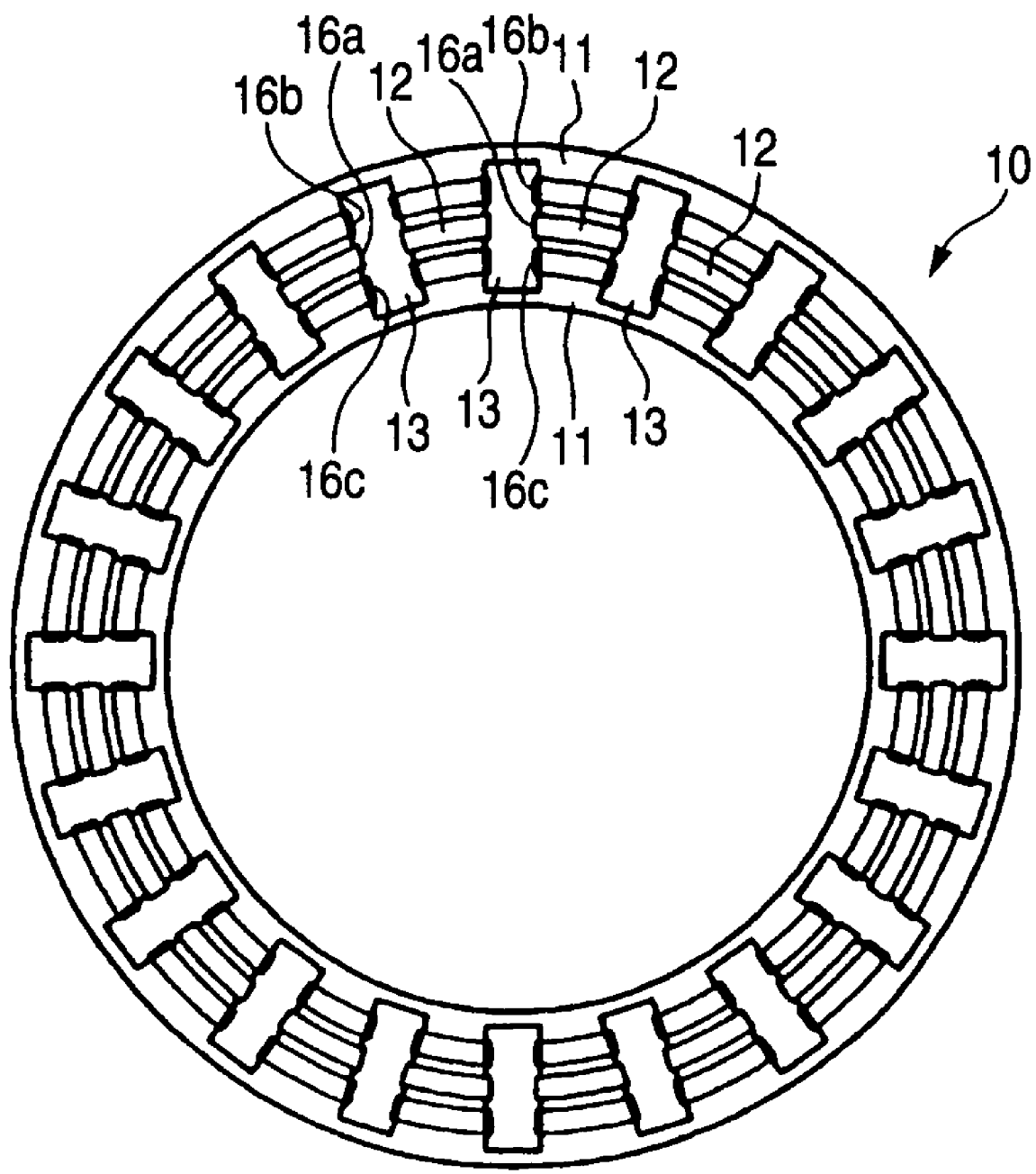
FIG. 1 is a plan view of a cage for a thrust roller bearing according to an embodiment of the invention.
Figure 2:
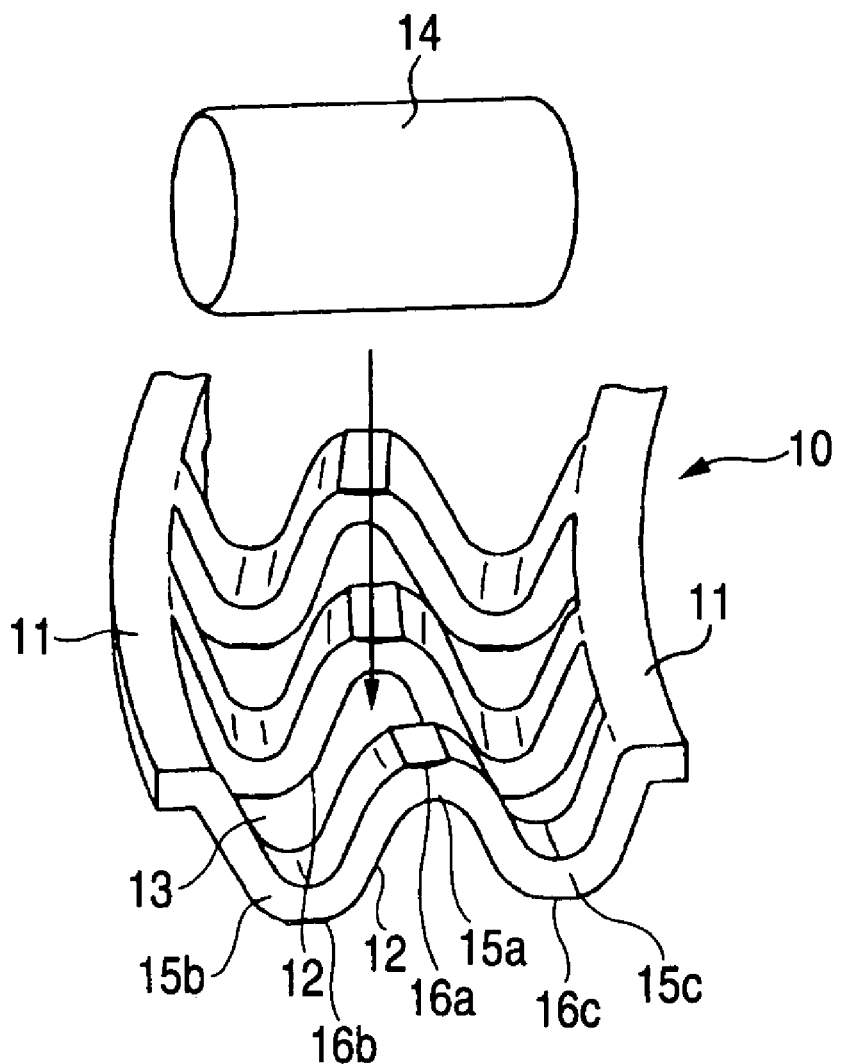
FIG. 2 is a partially enlarged perspective view of the cage of FIG. 1.
Figure 2:
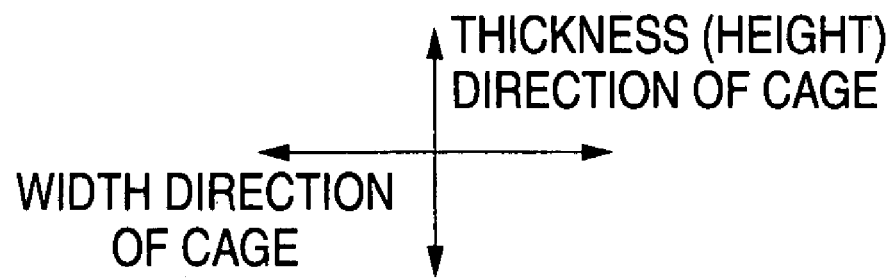
Figure 3:
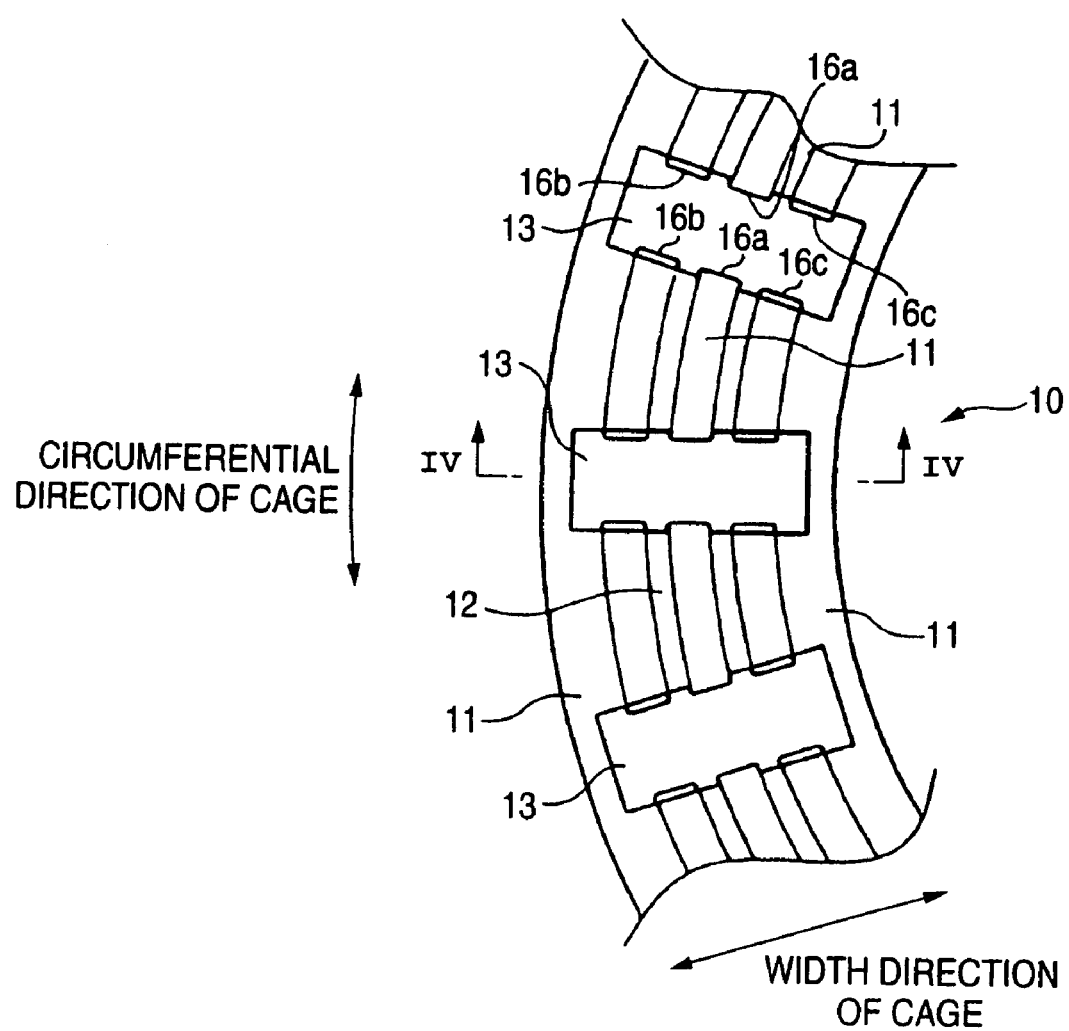
FIG. 3 is a partially enlarged developed plan view of the cage of FIG. 1.
Figure 4:
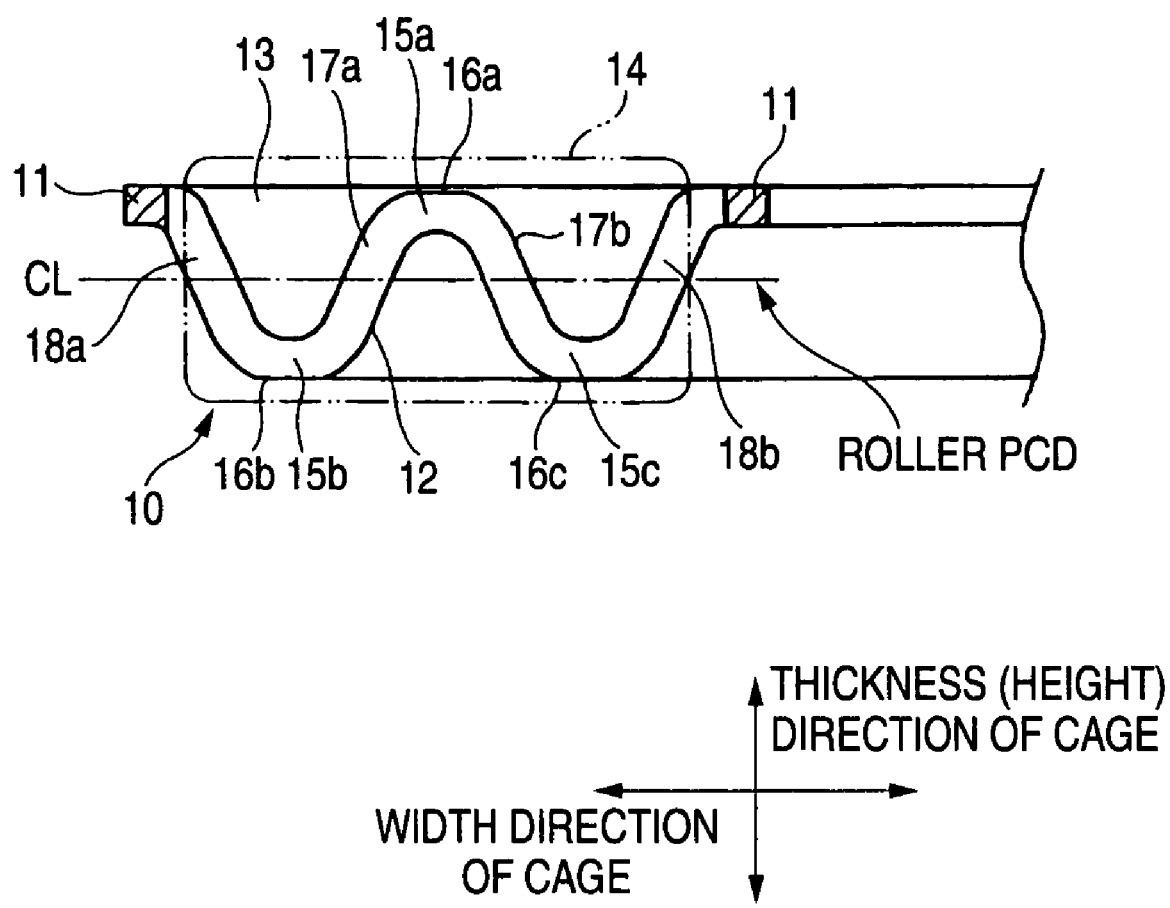
FIG. 4 is a sectional view taken along an IV-IV line of FIG. 3.

FIGS. 1 to 9 relates to a cage for a thrust roller bearing according to an embodiment of the invention. FIG. 1 is a plan view of the cage, FIG. 2 is a partially enlarged perspective view of the cage of FIG. 1, FIG. 3 is a partially enlarged developed plan view of the cage of FIG. 1, and FIG. 4 is a sectional view taken along an IV-IV line of FIG. 3. FIGS. 5A to 8B are views illustrating a manufacturing method of the cage according to the embodiment. FIGS. 9A and 9B are views showing each configuration of a roller stopping portion in the cage according to the embodiment.

The cage 10 according to the embodiment is a press-formed cage for a thrust roller bearing, so called press cage. The cage 10 includes concentric annular ribs 11 radially inside and outside. Both the annular ribs 11 face each other with a gap in the width direction of the cage (in the radial direction). A plurality of pillar portions 12 has opposite ends connected integrally with both the annular ribs 11, respectively, and are arrayed at regular intervals in a circumferential direction and radially from the center of the cage. A pocket 13 is formed in the shape of a rectangular window in the width direction of the cage by a space (hole portion) surrounded by the annular ribs 11 and two pillar portions 12 which face each other in the circumferential direction. Rollers 14 are respectively inserted into and retained by the pockets 13 in such a manner that the length direction of the roller extends in the longitudinal direction of the pocket.

In the aforementioned configuration, opposite sides of the pocket 13 which face each other in the radial direction are composed of internal surfaces of the two annular ribs 11 which face each other in the width direction of the cage and, opposite sides of the pocket 13 which face each other in the circumferential direction are composed of internal surfaces of the two pillar portions 12 which face each other in the circumferential direction.

The pillar portions 12 which face each other in the circumferential direction of the pocket 13 have a plurality of bent portions 15a, 15b and 15c which are alternately bent in the width direction of the cage to sandwich the roller PCD (diameter of a circle line CL connecting centers of the roller 14) in the thickness direction of the cage. The bent portions 15a, 15b and 15c are provided with roller stopping portions 16a, 16b and 16c which protrude into the pocket 13.

A middle bent portion 15a of the pillar portion and opposite bent portions 15b and 15c of the pillar portion on opposite sides of the middle bent portion in the width direction of the cage are joined together with inclined sections 17a and 17b of the pillar portion, which are inclined with respect to the width direction of the cage. The opposite bend portions 15b and 15c and the annular ribs 11 are respectively joined together with inclined sections 18a and 18b of the pillar portion, which are inclined with respect to the width direction of the cage. With this configuration, the internal surfaces of the pocket 13 have a W-shaped cross section.

In the aforementioned configuration, the bent portions 15a, 15b and 15c have a curved cross-sectional shape. Tip portions (imaginary line portions indicated by reference numerals 15a', 15b' and 15c' in enlarged view portions of FIG. 9A surrounded by circles X, Y, and Z) of the bent portions in the thickness (height) direction of the cage are formed in a cross-sectional shape that becomes narrower toward the tips by the above curved cross-sectional shape of the bent portions 15a, 15b and 15c. Further, the tip portions are drawn in a state where they protrude into the pocket 13 by plastic deformation working to form the roller stopping portions 16a, 16b and 16c. In the roller stopping portions 16a, 16b and 16c, the roller stopping portion 16a in the middle of the pillar portion retains a half of the roller 14 in one thickness (height) direction of the cage with respect to the roller PCD, and prevents dropping of the roller in the one thickness (height) direction of the cage. Similarly, in the roller stopping portions 16a, 16b and 16c, the roller stopping portions 16b and 16c at the ends of the pillar portion retains the other half of the roller 14 in the other thickness (height) direction of the cage with respect to the roller PCD, and prevents dropping of the roller in the other thickness (height) direction of the cage.

Figure 5A:
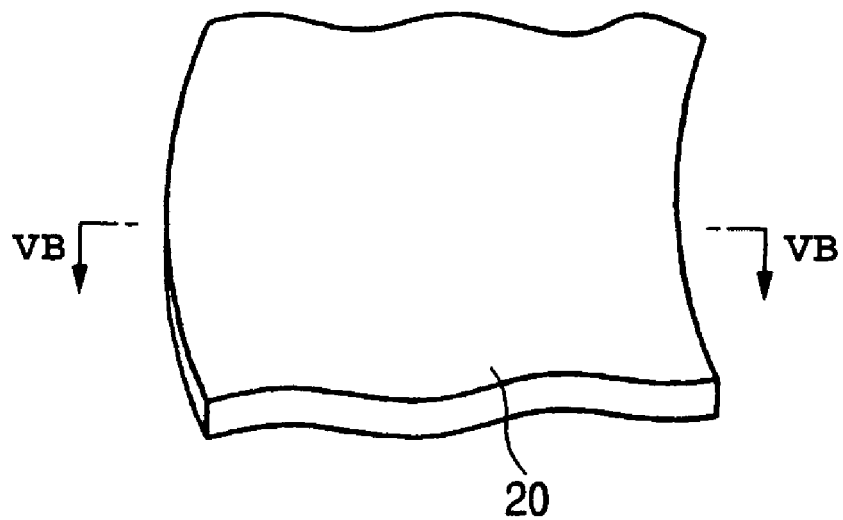
FIGS. 5A and 5B are views illustrating a blanking process in a manufacturing method of the cage of FIG. 1.
Figure 7A:
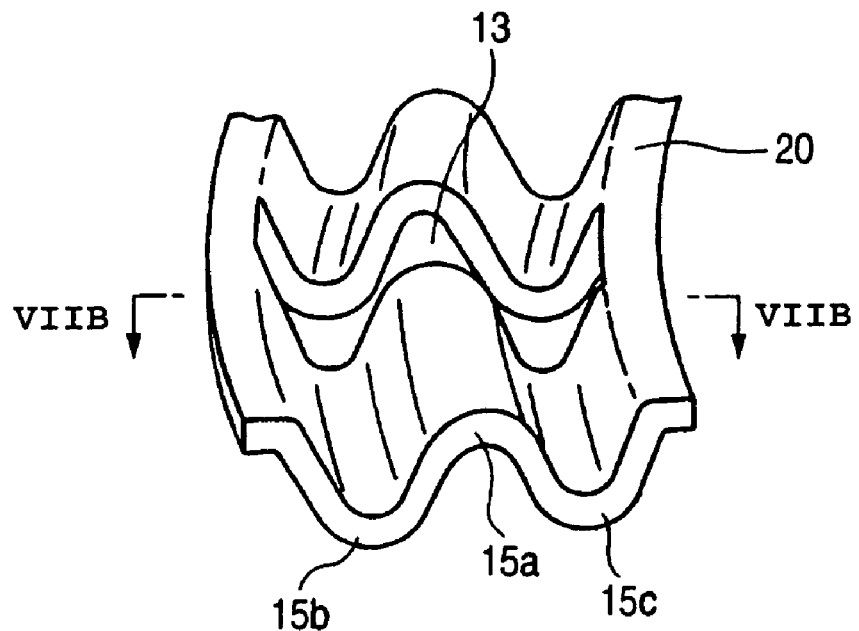
FIGS. 7A and 7B are views illustrating a pocket forming process in the manufacturing method of the cage of FIG. 1.
Figure 7B:
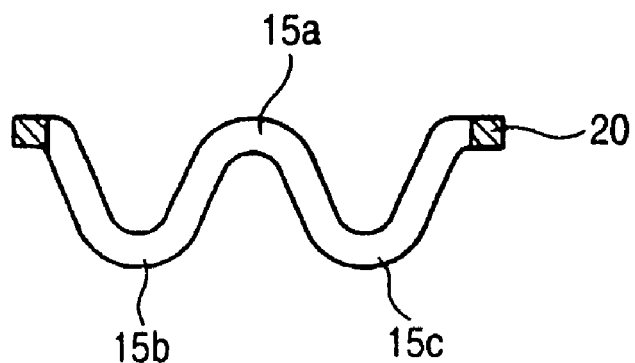
Figure 8A:
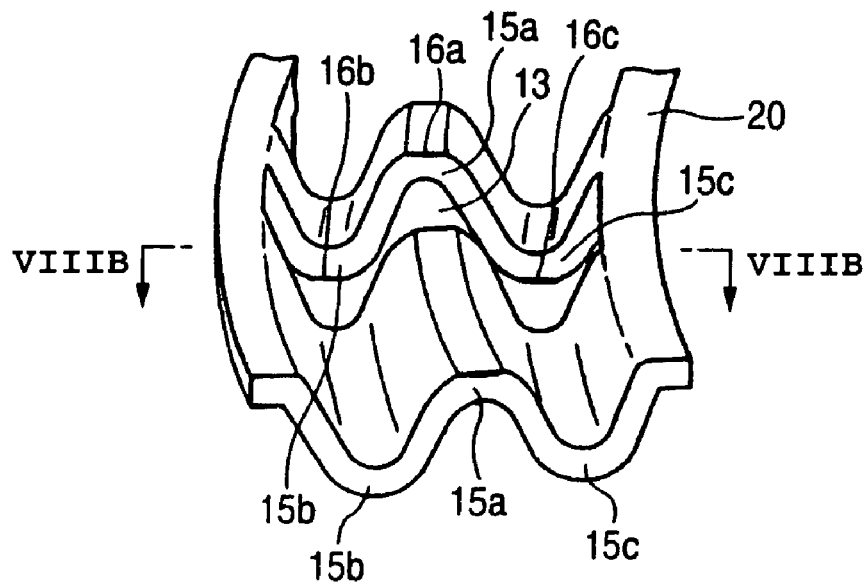
FIGS. 8A and 8B are views illustrating a roller stopping portion forming process in the manufacturing method of the cage of FIG. 1.
Figure 8B:
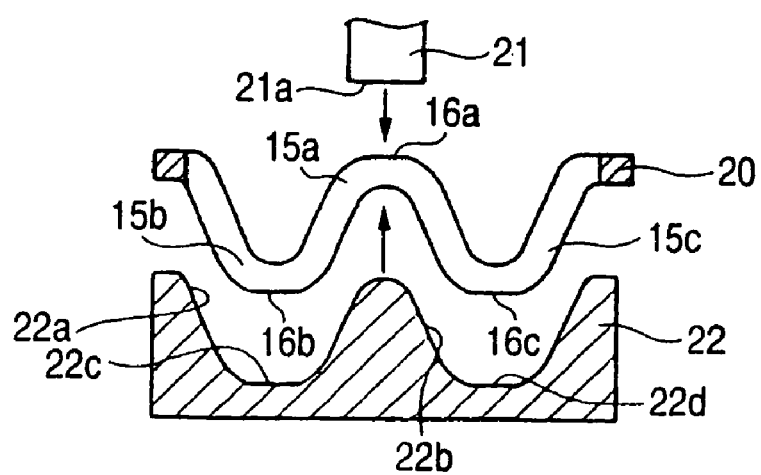

The manufacturing method of the cage 10 according to the embodiment will be described with reference to FIGS. 5 to 8. FIG. 5A is a partial perspective view of an annular black in a blanking process, FIG. 5B is a sectional view taken along a line B-B of FIG. 5A, FIG. 6A is a partial perspective view of an annular blank in a bent portion forming process, FIG. 5B is a sectional view taken along a line C-C of FIG. 6A, FIG. 7A is a view of an annular blank in a pocket forming process, FIG. 7B is a sectional view taken along a line D-D of FIG. 7A, FIG. 8A is a view of an annular blank in a roller stopping portion forming process, and FIG. 8B is a sectional view taken along a line E-E of FIG. 8A.

The manufacturing method includes a blanking process, a bent portion forming process, a pocket forming process, and a roller stopping portion forming process.

Figure 5B:

First, as shown in FIGS. 5A and 5B, an annular blank 20 is obtained by blanking a steel plate material (not shown), such as SPCC or SCM415 by the blanking process.

Figure 6A:
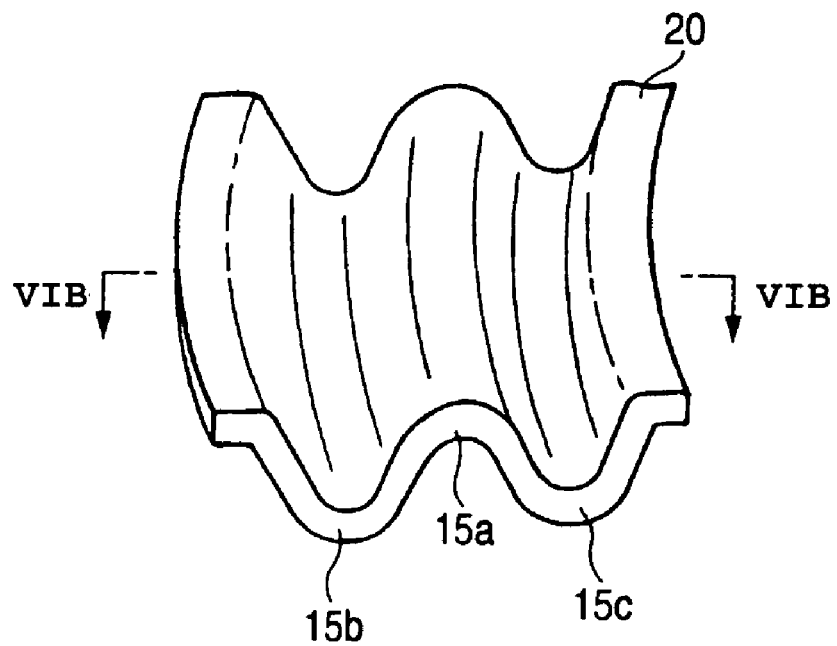
FIGS. 6A and 6B are views illustrating a bent portion forming process in the manufacturing method of the cage of FIG. 1.
Figure 6B:
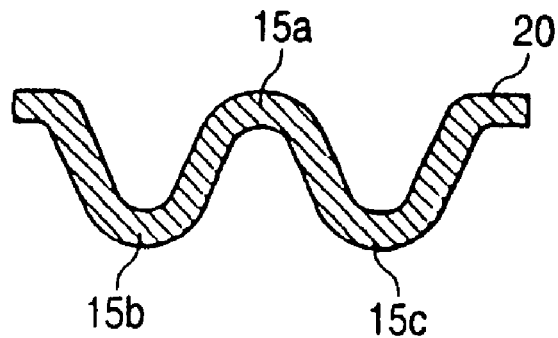

Next, as shown in FIGS. 6A and 6B, the annular blank 20 is formed in a bent shape having the plurality of bent portions 15a, 15b and 15c in the width direction of the blank by the bent portion forming process. These bent portions 15a, 15b and 15c have the curved cross-sectional shape that becomes narrower toward the tips in the thickness direction of the blank. The cross section of the annular blank 20 is formed in the shape of "W" by the bent portion forming process.

Next, as shown in FIGS. 7A and 7B, a plurality of pockets 13 are formed in the circumferential direction by punching the annular blank 20 in the pocket forming process.

Finally, as shown in FIGS. 8A and 8B, in the roller stopping portion forming process, tip portions of the bent portions 15a, 15b, and 15c in the thickness direction of the blank are drawn by deformation processing toward the pocket 13 in the vicinity of the pocket 13 using an upper forming mold (pressing punch) 21 and a lower forming mold (die) 22, thereby forming the roller stopping portions 16a, 16b and 16c. A bottom surface of the upper forming mold 21 has a flat part 21a for forming the roller stopping portions 16a, 16b and 16c in the annular blank 20. Further, the lower forming mold 22 has two convex forming mold surfaces 22a and 22b running along inner bottom surfaces of the annular blank 20, and convex flat parts 22c and 22d provided in the inner bottom surfaces, respectively. The shape of the flat part 21a or convex flat parts 22c and 22d can be set corresponding to a required protruding amount of the roller stopping portions 16a, 16b and 16c toward the pocket 13.

The annular blank 20 is disposed on the lower forming mold 22, and the tip portions 15a', 15b' and 15c' (refer to FIG. 9A) of the bent portions 15a, 15b and 15c of the blank 20 are pressed by the convex flat parts 22c and 22d of the inner bottom surfaces of the convex forming mold surfaces 22a and 22b of the lower forming mold 22, and the flat part 21a of the upper forming mold 21, thereby forming the roller stopping portions 16a, 16b and 16c.

Although the roller stopping portions 16a, 16b and 16c are simultaneously formed in the above embodiment, the roller stopping portion 16a and the roller stopping portions 16b and 16c may be formed in separate processes such that the convex flat parts 22c and 22d are not provided in the lower forming mold, but the roller stopping portions are formed only in the upper forming mold (punch) 21.

In addition, although there are various manufacturing processes, such as cleaning, carburizing and quenching, tempering, polishing, and surface treatment after the roller stopping portion forming process, the description thereof are omitted herein.

In the cage 10 according to the embodiment manufactured by the manufacturing method described above, the two pillar portions 12 of the pocket 13 which face each other in the circumferential direction have the plurality of bent portion 15a, 15b, and 15c which are alternately bent in the width direction of the cage to sandwich the roller PCD in the thickness direction of the cage. The tip portions 15a', 15b', and 15c' of the bent portions 15a, 15b, and 15c in the thickness direction of the cage have a curved cross-sectional shape before the pocket forming process. Then, in the pocket forming process, the tip portions 15a', 15b' and 15c' are drawn in a state where they protrude into the pockets 13 by plastic deformation processing, thereby forming the roller stopping portions 16a, 16b and 16c.

Figure 9A:
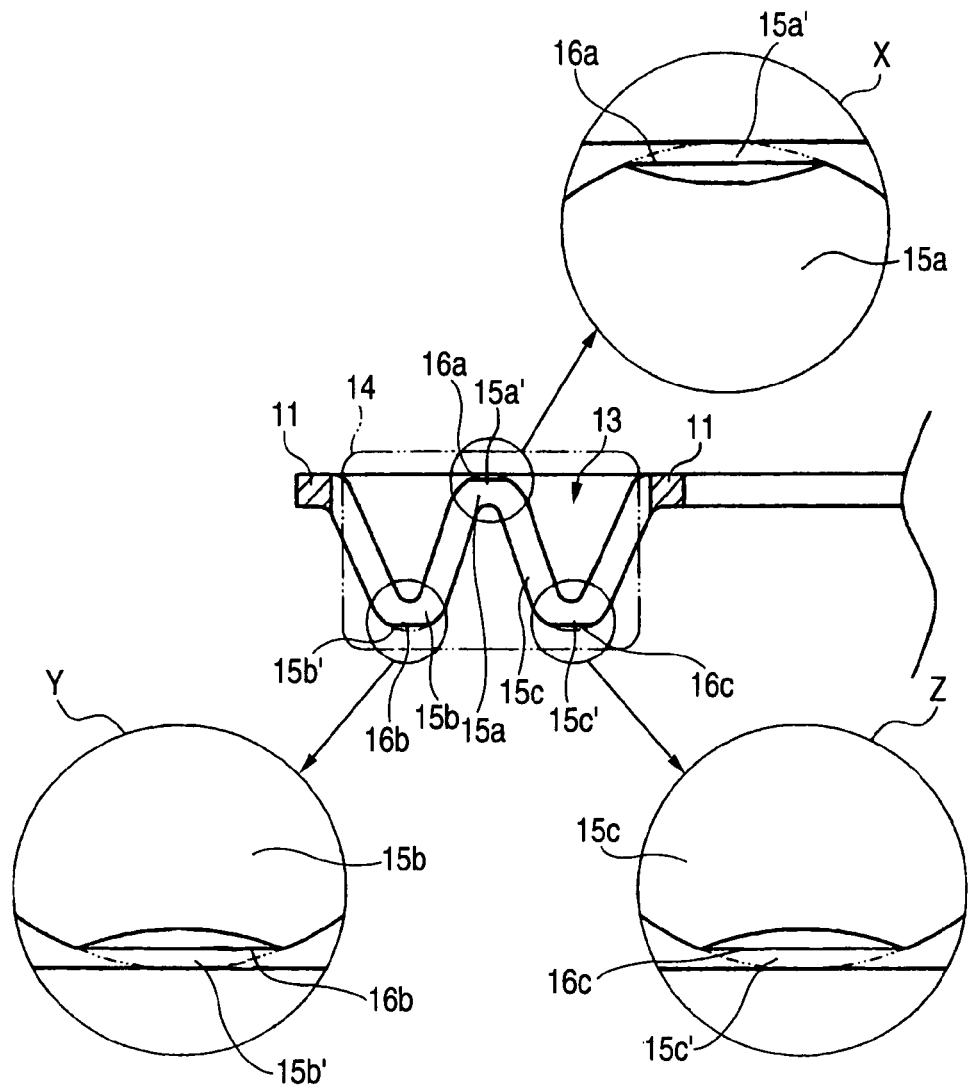
FIGS. 9A and 9b are views showing each configuration of a roller stopping portion in the cage of FIG. 1.
Figure 12:
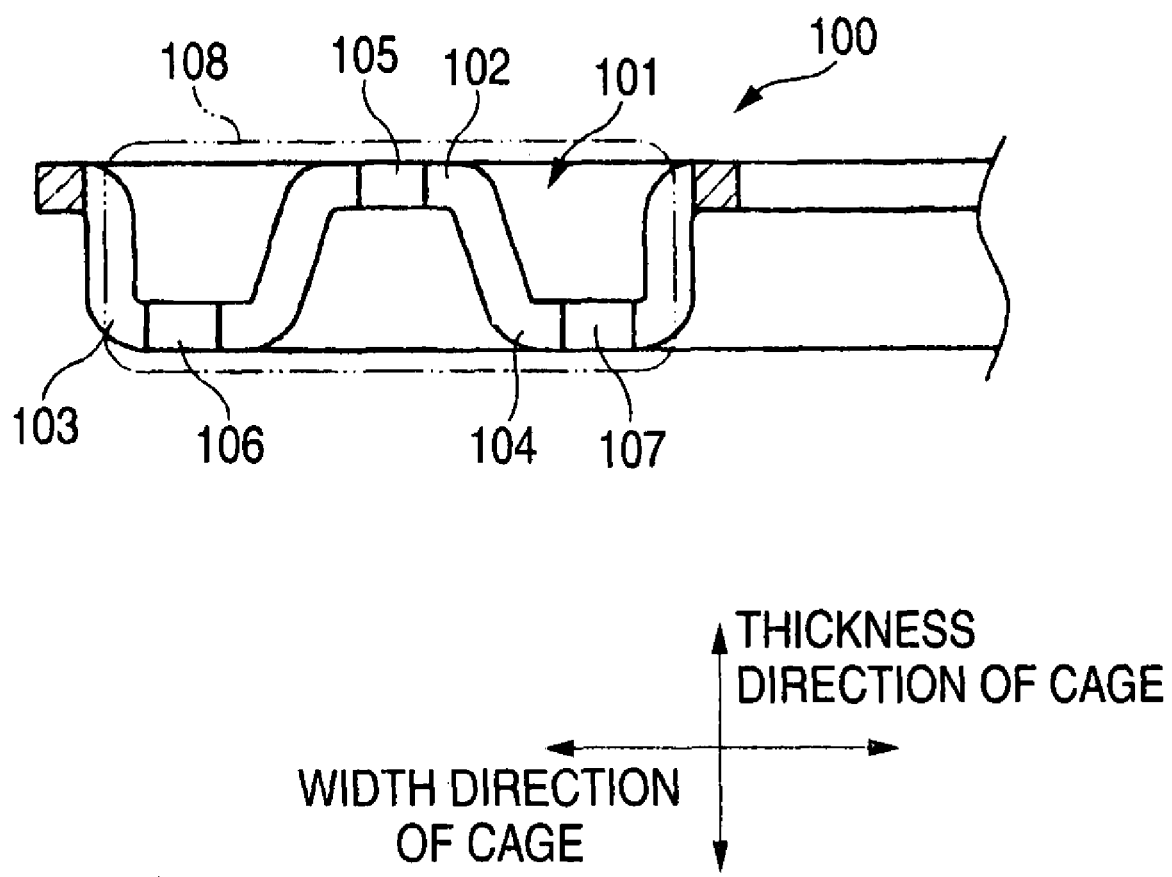
FIG. 12 is a sectional view of a conventional cage.

Next, referring to FIGS. 9A and 9B, the cage 10 according to the embodiment will be described in comparison with the conventional cage 100 shown in FIG. 12. FIG. 9A shows a cage capable of retaining a short roller in the cage 10 according to the embodiment, and FIG. 9B shows a cage whose thickness is made small in the cage 10 according to the embodiment.

As shown in FIG. 9A, in the cage 10 according to the embodiment, the tip portions 15a', 15b' and 15c' (portions indicated by imaginary lines within the extracted enlarged circles X, Y, and X) formed with the roller stopping portions 16a, 16b and 16c, respectively, are formed in a curved cross-sectional shape that becomes narrower toward the tips. Thus, flat parts which are long in the width direction of the cage do not need to be provided in the bent portions 15a, 15b and 15c in forming the roller stopping portions 16a, 16b and 16c. Accordingly, in the cage 10 according to the embodiment, the width of the cage is shortened whereby the interval of the roller stopping portions 16a, 16b and 16c can be made significantly shorter than a conventional cage. As a result, a roller whose length is short (short roller) can be retained.

Figure 9B:
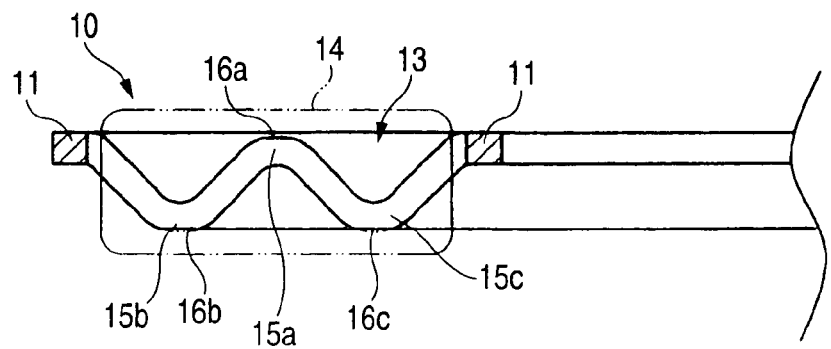

As shown in FIG. 9B, in the cage 10 according to the embodiment, the tip portions 15a', 15b' and 15c' are drawn in a state where they protrude into the pocket 13 by plastic deformation processing, thereby forming the roller stopping portions 16a, 16b and 16c. Thus, the thickness of the roller stopping portions 16a, 16b and 16c can be made less than the thickness of the bent portions 15a, 15b and 15c. In contrast, as compared with the conventional cage 100 in which the thickness of the roller stopping portions 16a, 16b and 16c is the plate thickness of the bent portions 15a, 15b and 15, the thickness (height) of the cage which retains the roller 14 having the same roller diameter can be reduced.

That is, assuming the interval of the roller stopping portions 16a, 15b and 16c and the plate thickness thereof are represented by "D" and "T", respectively, in the cage 10 according to the embodiment, the thickness of the cage becomes approximately D+α (where a (the thickness of the roller stopping portions) << plate thickness T). As a result, the interval D can be set to the thickness of the cage close to 2T at minimum according to the thickness of the roller. Consequently, the cage can be made smaller than the conventional cage beyond the limits of a reduction in the thickness of the conventional cage (the height of the cage).

Figure 10A:
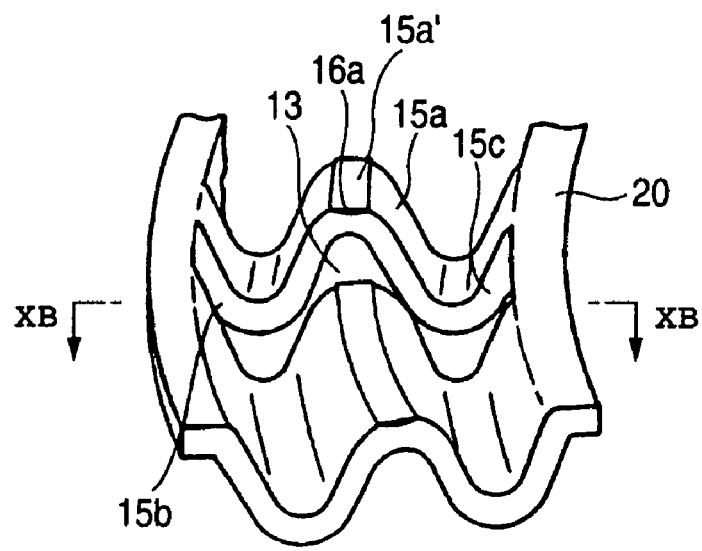
FIGS. 10A and 10B are views another modified example of the roller stopping portion forming process in the cage of FIG. 8.
Figure 10B:
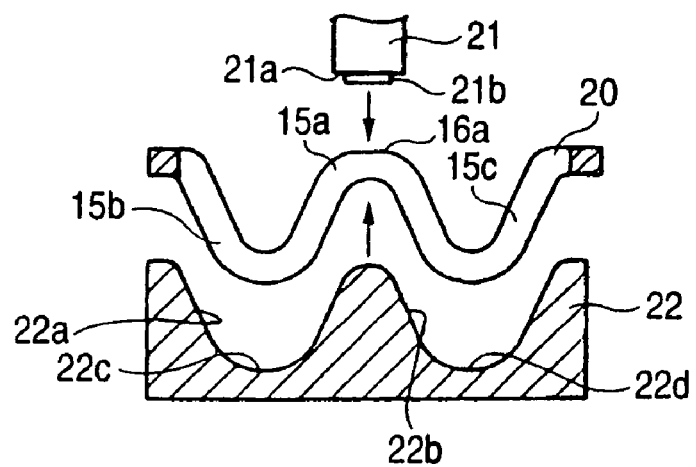

Other Embodiments (1) FIGS. 10A and 10B show other another modified example of the roller stopping portion forming process of FIGS. 8A and 8B. FIG. 10B is a sectional view taken along a line F-F of FIG. 10A. In the roller stopping portion forming process shown in FIGS. 10A and 10B, an inner circumferential surface 21a of the upper forming mold 21 is provided with a convex flat part 21b. By the lower forming mold 22 and the upper forming mold 21 shown in FIG. 10B, the tip portion 15a' of the bent portion 15a of the annular blank 20 is pressed and is drawn into the pocket 13, thereby forming the stopper 16a. In this case, the lower forming mold 22 is not provided with flat parts, but may be formed into a curved surface (curved-section shape). In this state, a workpiece is turned over after the roller stopping portion 16a is formed, and the roller stopping portions 16 and 16c are again provided in the opposite bent portions 15b and 15c by the upper forming mold in separate processes.

Figure 11:
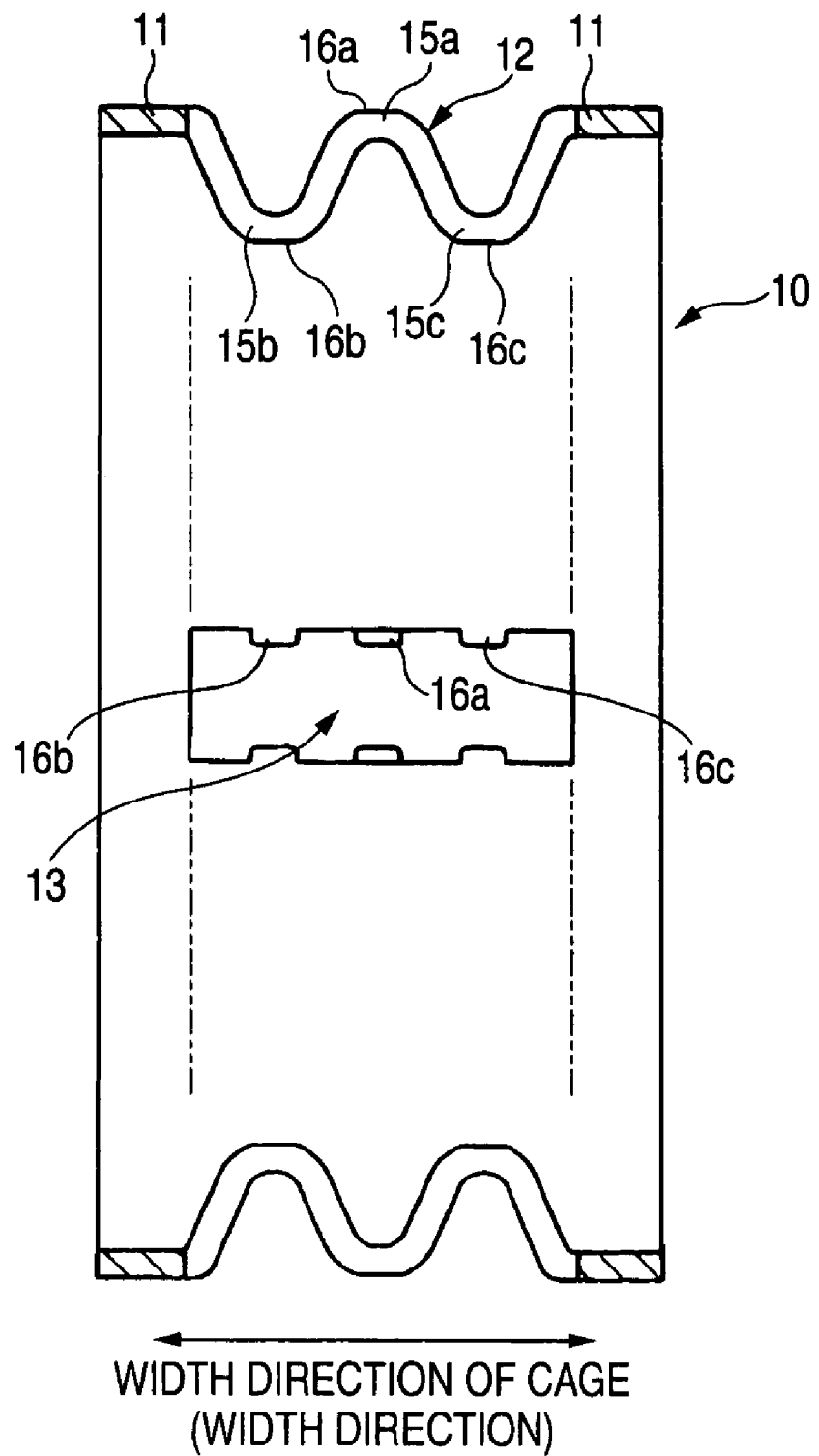
FIG. 11 is a plan view a cage for a radial roller bearing according to another embodiment of the invention.

(2) FIG. 11 is an enlarged view of a portion in the vicinity of a pocket of a radial type cage 10 according to another embodiment of the present invention. In the cage 10 according to this embodiment, the two pillar portions 12 which face each other in the circumferential direction of the pocket 13 has a plurality of bent portions 15a, 15b and 15c which are alternately bent in the width direction of the cage to sandwich the roller PCD in the thickness direction of the cage. The bent portions 15a, 15b and 15c are respectively provided with the stoppers 16a, 16b and 16c protruding into the pocket 13. The tip portions of the bent portions 15a, 15b and 15c in the thickness direction (radial direction) of the cage are formed in a shape that becomes narrower toward the tips, and the tip portions are drawn in a state where they protrude into the pocket by plastic deformation processing to form the roller stopping portions 16a, 16b and 16c.

In the cage 10 according to the embodiment shown in FIG. 11, the tip portions of the bent portions 15a, 15b and 15c formed with the roller stopping portions 16a, 16b and 16c are formed in a shape that becomes narrower toward the tips. Thus, the width of the cage be reduced, and a roller whose length is short (short roller) can be retained.

In the cage 10 according to the embodiment shown in FIG. 11, the tip portions are drawn in a state where they protrude into the pocket 13 by plastic deformation processing, thereby forming the roller stopping portions 16a, 16b and 16c. Thus, the height of the cage can be made lower than that of the conventional cage.

In addition, the present invention can be changed in various ways within the scope as set forth in the claims.

The invention claimed is:

1. A cage for a roller bearing, comprising:
    a plurality of pillar portions which are arranged in a circumferential direction of the cage for defining a pocket therebetween;
    a plurality of bent portions formed at a pillar portion of the plurality of pillar portions, wherein the plurality of bent portions are alternately bent in a width direction of the cage to sandwich a diameter of a pitch circle of a roller (PCD) in a thickness direction of the cage and a plurality of tip portions are formed at each of the plurality of bent portions in a cross-sectional shape comprising a width which decreases in a direction toward a plurality of tips thereof; and
    a plurality of roller stopping portions formed by drawing the plurality of tip portions in a state where the plurality of tip portions protrude into the pocket.

2. The cage according to claim 1, wherein the plurality of bent portions comprise a curved cross-sectional shape.

3. The cage according to claim 1, wherein the plurality of tip portions comprise an outer diameter, in relation a center axis of the roller, which decreases as the plurality of tip portions protrude into the pocket 4. The cage according to claim 1, wherein a distance between the plurality of roller stopping portions is substantially equal to twice a plate thickness of the plurality of roller stopping portions.

5. A method of manufacturing a cage for a roller bearing, the method comprising:
    blanking a steel plate to obtain an annular blank;
    forming a plurality of bent portions comprising a curved cross-sectional shape by bending the annular blank in a width direction of the annular blank, the plurality of bent portions being alternately bent in a width direction of the cage;
    punching the annular blank having the plurality of bent portions to form a plurality of pockets; and
    drawing a plurality of tip portions from the plurality of bent portions, which face each other in a circumferential direction of the pockets, so as to protrude into the plurality of pockets to form roller stopping portions.

6. The method according to claim 5, wherein the plurality of tip portions comprises an outer diameter, in relation to a center axis of the roller, which decreases as the plurality of tip portions protrude into the plurality of pockets.

7. The method according to claim 5, wherein said drawing of the plurality of tip portions is performed by a bottom surface of an upper mold including a flat part and a lower mold which includes a plurality of flat parts.

8. The method according to claim 5, wherein said drawing of the plurality of tip portions produces plastic deformation of the plurality of bending portions.

9. A cage for a roller bearing, comprising:
    a pocket configured to accommodate a roller therein;
    a plurality of pillar portions opposing each other in a circumferential direction of the cage across the pocket;
    a plurality of bent portions formed at each of the pillar portions and arrayed in a width direction of the cage, each of the bent portions being bent in a thickness direction of the cage to form a tip portion; and
    a roller stopping portion extending from the tip portion toward the pocket, and adapted to come in contact with an outer peripheral face of the roller, the roller stopping portion having a dimension in a thickness direction of the cage less than a dimension of the tip portion in the thickness direction of the cage.

10. The cage according to claim 9, wherein a tip face of the tip portion in the thickness direction of the cage is flat.

11. The cage according to claim 9, wherein the width direction of the cage is orthogonal to an axial direction of the roller bearing.

12. The cage according to claim 9, wherein the width direction of the cage is parallel to an axial direction of the roller bearing.

* * * * *